No. 12,341. REISSUED MAY 2, 1905.
T. SMITH.
BRACKET.
APPLICATION FILED DEC. 22, 1903.
3 SHEETS—SHEET 1.
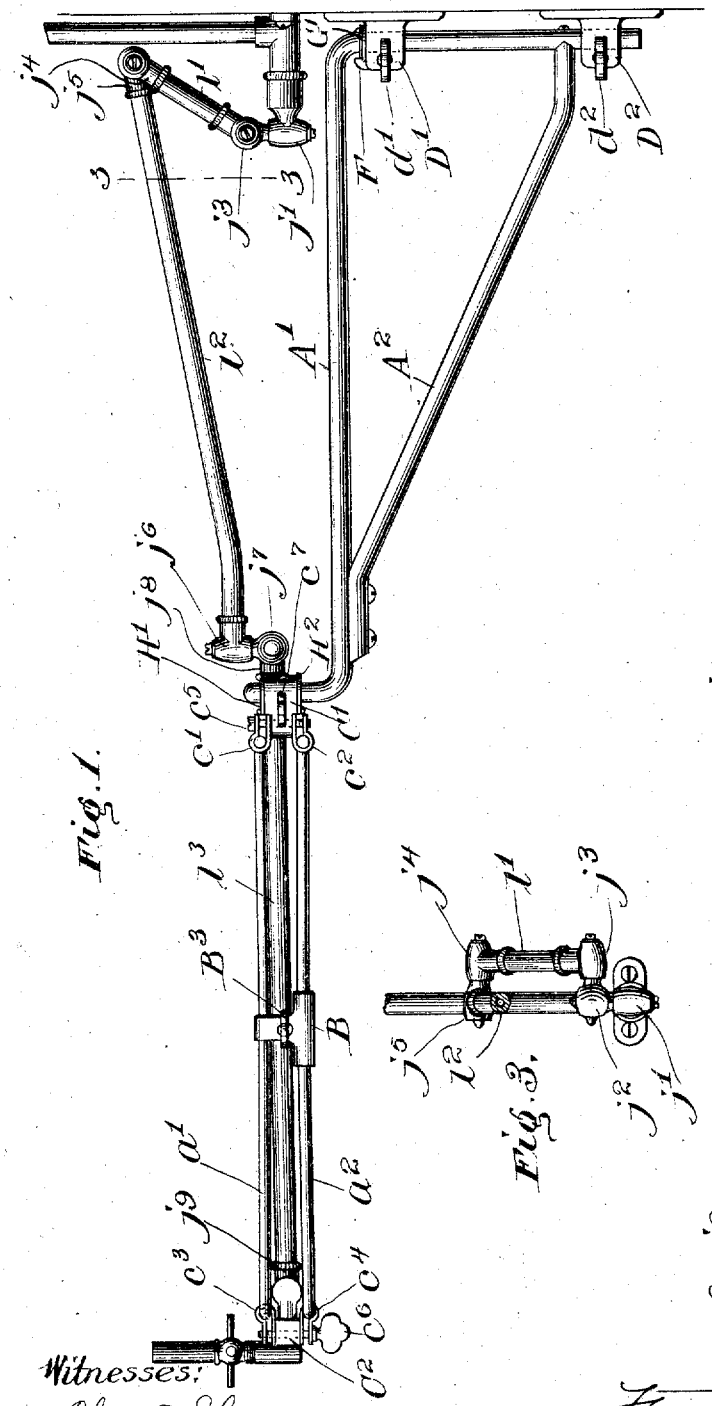
Fig. 1.
Fig. 3.
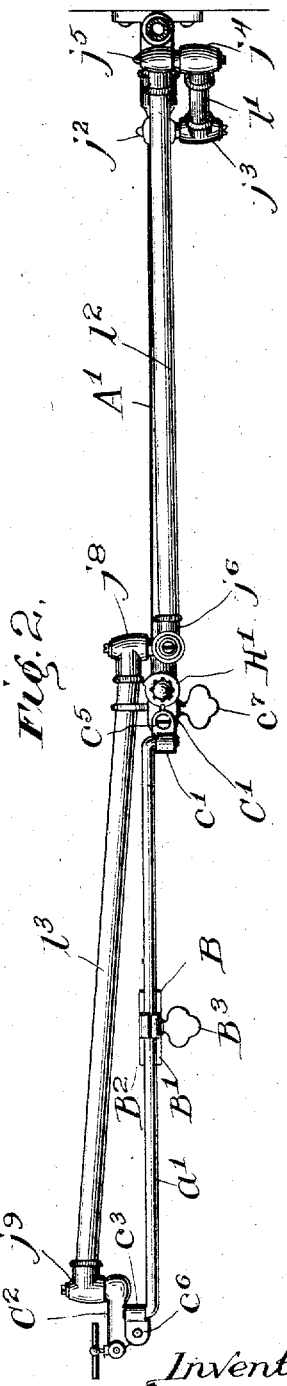
Fig. 2.
Witnesses:
Chas. O. Shurvey
Russell Wiles
Inventor:
Theodore Smith.
by H. P. Ritter
Atty.
PHOTO-LITHOGRAPHED BY SACKETT & WILHELMS LITHO. & PT'G. CO. NEW YORK.

No. 12,341. REISSUED MAY 2, 1905.
T. SMITH.
BRACKET.
APPLICATION FILED DEC. 22, 1903.
3 SHEETS—SHEET 2.
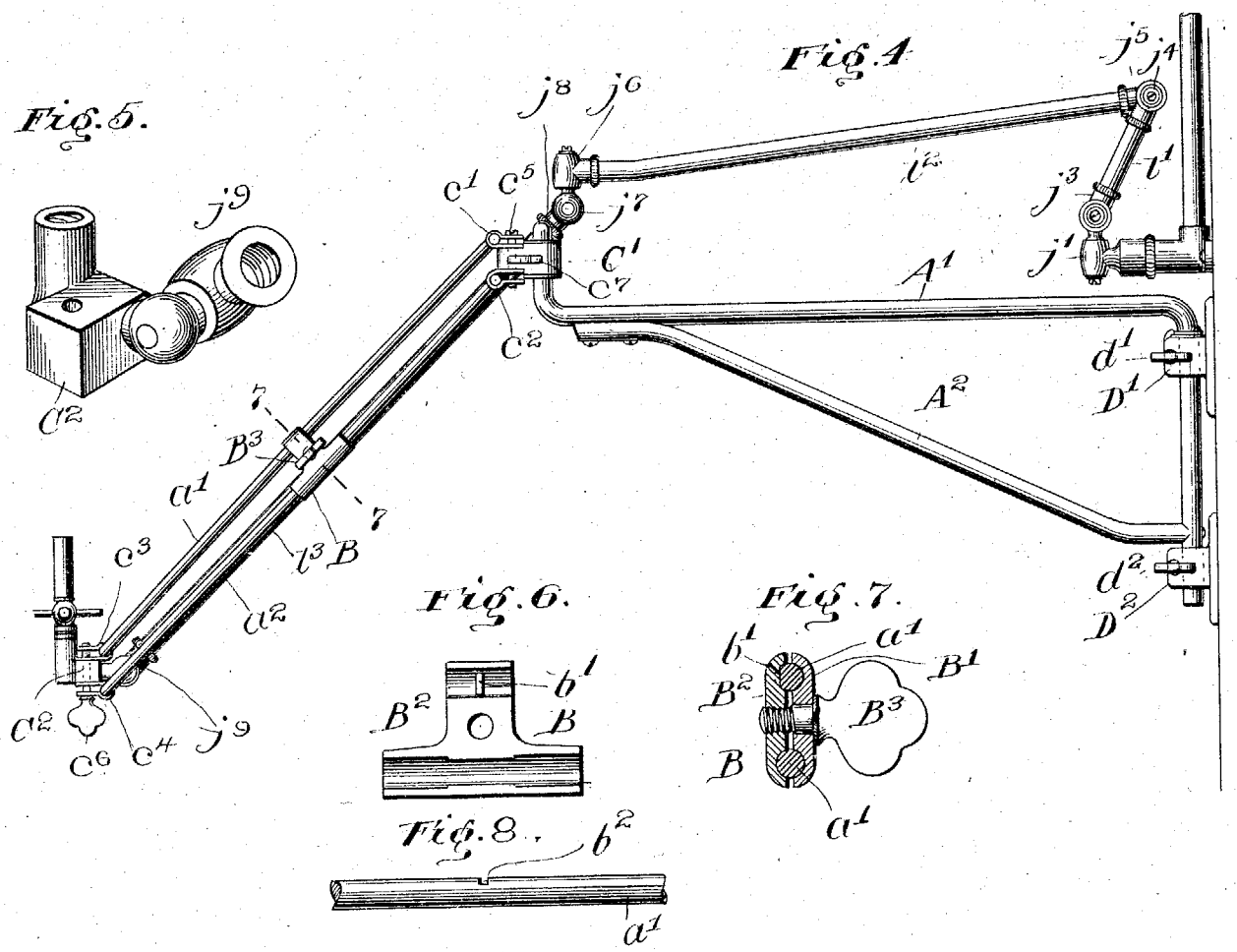
Witnesses:
Chas. O. Shurvey
Russell Wiles
Inventor:
Theodore Smith
by H. P. Titus
Atty.

No. 12,341. REISSUED MAY 2, 1905.
T. SMITH.
BRACKET.
APPLICATION FILED DEC. 22, 1903.
3 SHEETS—SHEET 3.
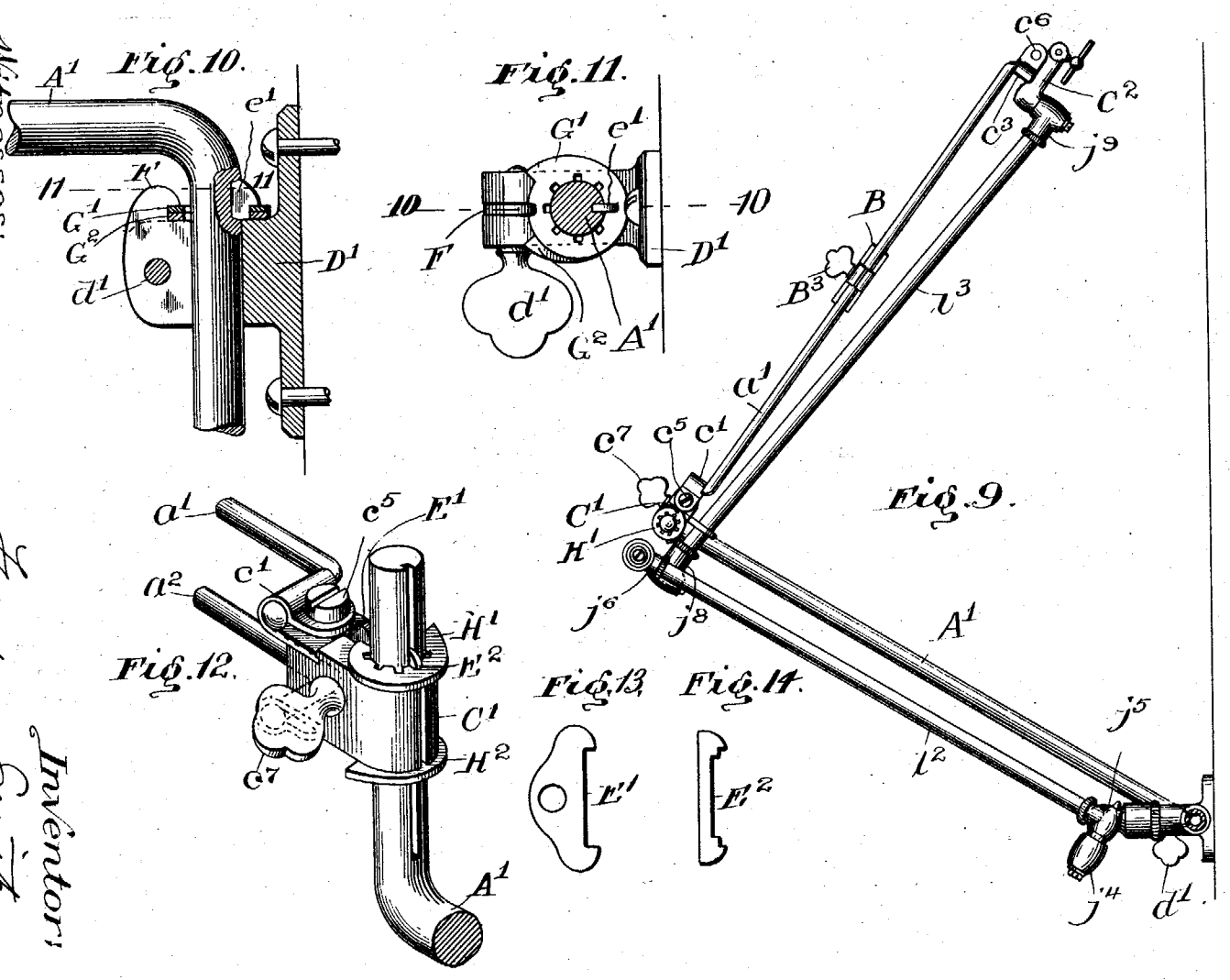
Witnesses:
Chas. O. Stowey
Russell Wide
Inventor:
Theodore Smith.
by H. P. Bitner.
Atty.
PHOTO-LITHOGRAPHED BY SACKETT & WILHELMS LITHO. & PT'G. CO. NEW YORK No. 12,341. Reissued May 2, 1905.

UNITED STATES PATENT OFFICE.

THEODORE SMITH, OF CHICAGO, ILLINOIS.

BRACKET.

SPECIFICATION forming part of Reissued Letters Patent No. 12,341, dated May 2, 1905.

Original No. 706,122, dated August 5, 1902. Application for reissue filed December 22, 1903. Serial No. 186,263.

*To all whom it may concern:*

Be it known that I, THEODORE SMITH, a citizen of the United States of America, residing at Chicago, in the county of Cook and State of Illinois, have invented certain new and useful Improvements in Brackets, of which the following is a specification.

My invention relates to certain new and useful improvements in brackets.

The object is to provide a bracket for supporting gas and electric lights, book-rests, dentist-tables, and like objects which will permit of vertical and longitudinal motion and which can be clamped firmly in position.

To these and certain minor ends my invention relates to certain novel features of construction, which will be described in the specification and the essential features of which will be pointed out in the claims.

In the drawings, Figure 1 represents a side elevation of my improved bracket supporting a jointed fixture. Fig. 2 represents a top elevation of the same in the same position. Fig. 3 represents a sectional elevation of the gas-pipe, taken in the line 3 3 of Fig. 1. Fig. 4 represents a side elevation of the bracket in a slightly different position. Fig. 5 represents a detail construction of one of the gas-pipe joints. Fig. 6 represents one-half of my locking device. Fig. 7 represents a cross-section of said locking device in the line 7 7 of Fig. 4. Fig. 8 represents a top elevation of one of the parallel rods of the second arm, showing the means for locking the clamp in place. Fig. 9 represents a top elevation of the bracket, showing the portion of the device intended to limit the horizontal swing of the bracket. Fig. 10 represents a detail cross-section of said device, taken in the line 10 10 of Fig. 11. Fig. 11 represents a detail top elevation of the same device. Fig. 12 represents a detail perspective of another form of the same device, which is the preferred form for the middle joint of my bracket. Fig. 13 is an elevation of the spline E′, shown in Fig. 12; and Fig. 14 is an elevation of the locking-piece $E^2$, shown in Fig. 12.

My device consists, preferably, of an arm composed of the rod A′, braced by the rod $A^2$ and swung upon the wall by means of two smaller brackets D′ $D^2$, wherein the rod A is clamped by means of the set-screws $d'$ $d^2$. Upon the end of the arm A′, which is upturned, as shown in Fig. 1, is supported a block C′, embracing the upturned end of the rod A′ and provided with the set-screw $c^7$, by which the pressure of the block upon the upturned end of said arm may be regulated. The block C′ is provided with two metal clips $c'$ $c^2$, held in place by means of a screw $c^5$. In the curved extremities of said clips are inserted the ends of the parallel rods $a'$ $a^2$, which at their farther ends are embraced by two other clips, $c^3$ $c^4$, similar to $c'$ $c^2$, and held in place by the thumb-screw $c^6$ upon a block $C^2$. This block may either form part of a gas-bracket, as shown in Fig. 1, or it may act as a supporting device for an electric lamp or support a dentist-table, book-rest, or any other like object.

The two rods $a'$ $a^2$ are embraced, substantially at their center, by the clamp B, (shown in detail in Figs. 6 and 7,) which consists in its preferred form of two parts B′ $B^2$, held together by the thumb-screw $B^3$. The part $B^2$ is provided with a rib $b'$, which is adapted to fit in the slot $b^2$ of the rod $a'$. The rods $a'$ $a^2$ are made sufficiently flexible to permit of the motion of the bracket up and down in spite of the fact that the rods are held at a constant distance apart. When it is desired to secure the bracket in place, the set-screw $B^3$ is tightened, and it then becomes impossible for the parallel-bar arm to move vertically.

It is to be noted that the two rods $a'$ $a^2$ are made of equal flexibility, and consequently as the bracket is moved up and down and these rods are put under a bending strain on account of the fact that their ends are brought nearer together and their centers are held the same distance apart by the clamp each will bend to the same extent. The fact that these rods are of equal flexibility is essential to the preserving of a perfect parallel movement between the block $C^2$ and the block C′, for when these rods bend they necessarily shorten in length, and if they are not of equal flexibility one rod will shorten more than the other, and this will necessarily result in the block $C^2$ taking a more or less inclined position as it is moved up and down. With a gas-burner of the type shown in the drawings this swing from the vertical which would be caused if the rods were of unequal flexibility is of comparatively minor importance; but if any gas-lamp having a chimney or if a dental table or the like were supported by the bracket this swing would be very detrimental. Consequently I consider it of the utmost importance to make these rods of equal flexibility, although a bracket could be made without this feature which would be perfectly useful for certain purposes—as, for instance, supporting electric lights, where a slight angular movement would be immaterial. It is of course evident that this feature is of utility only when a clamp is used which grasps the rods between their ends and keeps them at its point of engagement at substantially the same distance.

In practice the set-screw $B^3$ is only tightened to such an extent that the parallel-bar arm will remain in position and not move by its own weight or the weight of the object supported at its extremity. It is, however, usually quite possible to move the arm by the application of considerable force in spite of the clamp.

When this bracket is used to support a gas-light, either a jointed tube, as shown in the drawings, or a flexible rubber tube may be used. It is necessary to have some means of limiting the horizontal swing of the bracket in order to prevent the flame from coming into contact with the wall. To this end I have provided the device shown in Figs. 9 to 14. The device shown in Figs. 10 and 11 is that used where the bracket is swung upon the wall and is fixed upon the smaller bracket D′. It consists of two plates $G'$ $G^2$, provided with radial extensions and with suitable notches to engage a spline $e'$, attached to the arm A′, so that the distance between the two radial extensions of said plates may be regulated. These radial extensions engage a stop F, which is clamped in the bracket D′ by means of the set-screw $d'$. When it is desired to alter the distance between said radial extensions in order to permit of greater or less swinging of the bracket, the screws $d'$ $d^2$ are loosened and the bracket is then raised, thereby raising the spline $e'$ and releasing the plates $G'$ $G^2$, which may be then set in any desired position and locked there by replacing the bracket.

Figs. 12, 13, and 14 represent another form of this device, which I prefer to use in connection with the block C′ at the central joint of the bracket. In this device the two plates $H'$ $H^2$, provided with radial extensions, are separated by the thickness of the block C′ and held in place by the metal plate $E^2$, which engages notches in the plates similar to those in the other plates, $G'$ $G^2$. The metal plate $E^2$ is held in a slot in the upturned end of the rod A′, and the radial extensions engage the plate E′, which is clamped in place by the set-screw $e^7$, running through the block. When it is desired to regulate the distance between the radial extensions of the plates in this device, the set-screw is loosened and the block is entirely lifted off the upturned end of the rod A′, the radial extensions are adjusted as desired, and the block is then replaced. In using this bracket for supporting gas-lights the two parts are adjusted as shown in Fig. 9, so that when both joints are turned as far as possible one way the ends of the bracket will be held some slight distance away from the wall. In use with the electric light said fastenings are unnecessary; but they would probably save frequent breaking of the globe by striking the wall, and in use for supporting tables and book-rests these limiting devices may be used or not, as convenient; but there are no doubt many cases in which they will greatly add to the utility of the bracket.

As hereinbefore stated, the gas-burner used with this bracket may be either connected with the supply by a flexible rubber tube or by jointed tubing, as shown in the drawings. It consists of the joints $j'$ $j^2$ $j^3$ $j^4$ $j^5$ $j^6$ $j^7$ $j^8$ $j^9$, connected by the pipes $l'$ $l^2$ $l^3$. As will be seen by examination of the drawings, the arrangement of the joints is such that there is a universal joint at all points, and the gas-pipes can be moved in any direction. This form of tubing has certain advantages over the flexible rubber tubing, for the reason that it can be made perfectly gas-tight, while the rubber tubing cannot.

I realize that considerable changes can be made in the details of this bracket without materially altering its general construction, and I do not intend to specifically limit myself to the construction herein set forth.

I claim as new and desire to secure by Letters Patent—

1. The combination in a bracket, of an arm, adapted to be supported upon the wall and to swing in a horizontal plane, a block pivoted upon the extremity of said arm, likewise adapted to swing in a horizontal plane, a second arm, composed of two parallel rods connected to said block and adapted to swing in a vertical plane, said arm supporting, at its extremity, a second block, adapted to serve as a supporting device, with a clamp adapted to fix the position of said parallel-bar arm in any desired position; substantially as described.

2. The combination in a bracket, of an arm, adapted to be supported upon the wall and to swing in a horizontal plane, a block pivoted upon the extremity of said arm, likewise adapted to swing in a horizontal plane, a second arm, composed of two parallel rods connected to said block and adapted to swing in a vertical plane, said arm supporting, at its extremity, a second block, adapted to serve as a supporting device, with a clamp embracing said parallel arms and adapted to fix their relative positions, thereby fastening the parallel-bar arm in any desired position; substantially as described.

3. The combination in a bracket, of an arm, adapted to be supported upon the wall and to swing in a horizontal plane, a block pivoted upon the extremity of said arm, likewise adapted to swing in a horizontal plane, a second arm composed of two parallel rods connected to said block and adapted to swing in a vertical plane, said arm supporting, at its extremity, a second block, adapted to serve as a supporting device, with a clamp consisting of two portions, B′, B², connected with a set-screw, embracing said parallel bars, one of said portions being provided with a rib, *b*′, adapted to engage a notch, *b*², of one of said parallel arms, said clamp being adapted to be tightened by movement of said set-screw upon the other part of the arm, thereby fixing the position of the arm as desired; substantially as described.

4. The combination, in a bracket, having two arms suitably pivoted together, one of which contains two parallel rods, *a*′, *a*², for controlling the movement thereof in one plane, of a limiting device for the joint, consisting substantially of two plates, provided with radial extensions adapted to be held in place upon one of the arms of said bracket, and a projecting plate upon the other arm, said radial extensions being adapted to engage said spline to limit the movement of the arm, with a clamp, B, adapted to hold firmly the bars, *a*′, *a*², against relative longitudinal movement; substantially as described.

5. The combination, in a bracket, with a suitably-pivoted arm having a grooved end, a second arm containing two suitably-pivoted parallel rods, pivoted upon the upturned end of said first arm, a device for limiting the horizontal movement of said second arm, consisting substantially of a plate, E², seated in said groove, a second plate supported on said second-named arm, and the plates, H′, H², provided with radial extensions adapted to strike the plate, E′, and held against radial movement upon said upturned end, of a clamp composed of two parts, B′, B², adapted to hold the parallel rods of said second-named arm against relative longitudinal movement; substantially as described.

6. In a bracket, the combination with a suitable support, of a swinging arm pivoted therein and a device for limiting the movement of said arm comprising substantially two plates formed with radial extensions and with notches, a plate upon the support seated in notches in said plates to prevent rotation of said plates with respect to the support and a stop-plate upon the arm adapted to strike said radial extensions in the movement of said arm upon the support; substantially as described.

7. In the bracket, the combination with a support, of an arm journaled thereupon, containing two blocks and a pair of parallel rods pivoted upon said blocks and a device for limiting the movement of said arm upon the support comprising substantially two perforated plates seated upon said support and having radial extensions, and notches extending from said perforations, a plate seated in said support and engaging either of the notches in the plates, a second plate seated in said block and adapted to engage said radial extensions in the movement of the arm relative to said support; substantially as described.

8. In a bracket, the combination with a grooved vertical support, an arm pivoted thereupon and comprising substantially a split block seated upon the upturned end, a second block, a pair of parallel arms pivoted to both blocks and a set-screw adapted to clamp the block upon the support, of a device for limiting the swinging movement of said arm upon the support, comprising substantially two notched plates provided with radial extensions seated upon the support, a plate seated in the groove in the support and in the notches of the plates and a second plate secured in the block and adapted to strike the radial extensions, to limit the movement of the arm upon the support; substantially as described.

9. In a device of the class described, the combination with two blocks relatively movable with respect to each other, of two parallel rods connecting said blocks and a clamp consisting of two portions, B′, B², connected by a set-screw embracing said parallel rods, one of said portions being provided with a rib, *b*′, adapted to engage a notch, *b*², in one of said parallel rods, said clamp being adapted to be tightened by movement of said set-screw upon the other block.

In witness whereof I have hereunto set my hand, at Chicago, in the county of Cook and State of Illinois, this 8th day of December, A. D. 1903.

THEODORE SMITH.

Witnesses:
CHAS. O. SHERVEY,
RUSSELL WILES.